United States Patent [19]

Bloemer et al.

[11] Patent Number: 5,573,165

[45] Date of Patent: Nov. 12, 1996

[54] MULTI-FUNCTIONAL BRACKET FOR CARRIER RACK

[75] Inventors: John M. Bloemer, Madison, Wis.; John M. Kaloustian, Northville, Mich.

[73] Assignee: Graber Products, Inc., Madison, Wis.

[21] Appl. No.: 392,547

[22] Filed: Feb. 17, 1995

[51] Int. Cl.$^6$ ............................ B60R 9/10; B60R 9/12
[52] U.S. Cl. .................. 224/523; 224/531; 224/537; 224/553; 224/571; 224/924; 224/917.5
[58] Field of Search .................. 224/282, 488, 224/522, 523, 531, 533, 534, 537, 553, 563, 564, 567, 568, 571, 924, 917.5, 518–521; 248/309.1; 211/2, 17, 70.5

[56] References Cited

U.S. PATENT DOCUMENTS

| | | | |
|---|---|---|---|
| 565,520 | 6/1896 | Fonda . | |
| 569,289 | 10/1896 | Lynch | 224/483 |
| 577,910 | 3/1897 | Bierbach . | |
| 2,512,267 | 6/1950 | Donnelley . | |
| 2,803,349 | 8/1957 | Talbot . | |
| 4,116,341 | 9/1978 | Hebda | 211/17 |
| 4,271,997 | 6/1981 | Michael | 224/917.5 |
| 4,336,897 | 6/1982 | Luck | 224/924 |
| 4,452,385 | 6/1984 | Prosen | 224/321 |
| 4,513,897 | 4/1985 | Graber | 224/314 |
| 4,676,414 | 6/1987 | Deguevara . | |
| 4,875,608 | 10/1989 | Graber . | |
| 4,948,021 | 8/1990 | Murphy et al. . | |
| 4,997,116 | 3/1991 | Grim . | |
| 5,050,785 | 9/1991 | Hays | 224/924 |
| 5,056,700 | 10/1991 | Blackburn et al. | 224/324 |
| 5,211,323 | 5/1993 | Chimenti et al. | 224/314 |
| 5,259,542 | 11/1993 | Newbold et al. | 224/324 |
| 5,305,936 | 4/1994 | Nusbaum | 224/324 |
| 5,385,280 | 1/1995 | Littlepage et al. . | |

FOREIGN PATENT DOCUMENTS

| | | | |
|---|---|---|---|
| 1066960 | 6/1954 | France | 224/917.5 |
| 2476565 | 8/1981 | France | 224/917.5 |
| 2278819 | 12/1994 | United Kingdom . | |

OTHER PUBLICATIONS

1995 Rhode Gear catalog, 1994 Rhode Gear.
"Hollywood™ Racks: Simple. Strong. Secure. 1994 Master Fit List" brochure.
1994 Thule® catalog.
Allen® 143A brochure, R.A. Allen Co., Inc., Lincoln, MA.
Allen® 104A brochure, R.A. Allen Co., Inc., Lincoln, MA.
Allen® 103A brochure, R.A. Allen Co., Inc., Lincoln, MA.
"Stealth Rak™ #SR3000: Bumper–Mounted, 3–Bike Carrier" brochure, Bard Wyers Sports, Inc.

(List continued on next page.)

Primary Examiner—Henry J. Recla
Assistant Examiner—Gregory M. Vidovich
Attorney, Agent, or Firm—Lathrop & Clark

[57] ABSTRACT

The brackets of this invention are mounted to the rearwardly extending tubular arms of a conventional carrier rack to alternatively support bicycles or skis by adjustable positioning of the brackets. Each bracket has a body configured on one side to engage with and support a bicycle frame tube, and on the other side to support a ski. The bracket is positionable on a support arm and may be locked to restrict sliding and rotating with respect to the carrier arm. The ski supporting side of the body has a planar surface and a lip which engages with the toe bracket of the ski binding to position and hold in place the ski. The bicycle supporting side of the bracket body has two pairs of opposed, outwardly extending resilient tipped fingers which engage either the vertical or horizontal tube of a bicycle frame. A rubber strap extends from one side of the body to encircle either a bicycle tube or skis and is engaged by a hook on the other side of the body. The carrier mounting bracket may be utilized with a trunk carrier or with a hitch carrier. For use with a carrier having only a single rearward arm, two brackets may be pinned to a central structural member having a split-ring clamp 104 which engages the single arm. One bracket may then be extended horizontally to support the horizontal tube of the bicycle, and the other bracket pivoted vertically to support the bicycle vertical tube.

11 Claims, 10 Drawing Sheets

OTHER PUBLICATIONS

"Mini Stealth™ #MS2000: Two–Bike Bumper–Mount Carrier" brochure, Bard Wyers Sports, Inc.

"Spare Logic™ #SL2000B: Two–Bike Spare Tire–Mount Carrier" brochure, Bard Wyers Sports, Inc.

"Quik Hitch™ #T–QH4000: Multi–Fit 2 & 4 Bike Trailer Hitch Systems" brochure, Bard Wyers Sports, Inc.

"Voyager Rak #VTR2000: Two Bike Trunk–Mount Carrier" brochure, Bard Wyers Sports, Inc.

"Ski Logic™ #SLK4000: Ski Carrier System (4 pairs)" brochure, Bard Wyers Sports, Inc.

Graber USA 1995 Product Information & Compatability Guide.

MULTI-FUNCTIONAL BRACKET FOR CARRIER RACK

FIELD OF THE INVENTION

The present invention relates to an apparatus for carrying articles attached to a motor vehicle in general, and to an apparatus for carrying bicycles and skis on automobiles in particular.

BACKGROUND OF THE INVENTION

Recreational equipment, more particularly skis and bicycles, are often transported by the family motor vehicle. If the skier owns, rather than rents, skis, they must be routinely transported from the home to the ski slope. With the recent growth and development of recreational biking, bicycle riding is not only a means for traveling to a destination, but a recreational goal in itself. Indeed, active bicyclists often transport their bicycles to areas of interest, sometimes hundreds of miles from home, where novel scenery may be enjoyed without the need for long distance bicycling. The frequent bicyclist finds a routine need for convenient bicycle transport in the family vehicle to-bike trails and bike sporting events. Only the largest trucks or cars can conveniently accommodate a bicycle or skis in the passenger compartment or trunk, and even then space for luggage and passengers is compromised. To address the need for convenient exterior transport, carrier racks have been developed.

Carder racks are typically mounted either to the roof of a vehicle or over the trunk. A third option is a carrier mounted to a trailer hitch.

Conventional brackets are typically designed to carry either bikes or skis, not both. Some bike racks can be adapted to also hold skis by a change of attachment brackets. One carrier, disclosed in U.S. Pat. No. 5,373,978 to Buttchen, et al., has an attachment system which can be used to grip skis or bikes. The ability to hold skis or bikes provides several advantages to the recreationally inclined consumer. A single carrier tends to be less costly than two carriers. Furthermore, one carrier is less bulky than two and hence more conveniently stored when not in use. In addition, a multipurpose carrier is easier for an operator to become familiar with installing and removing a single carrier rack, as opposed to mastering the particular requirements of two separate carrier racks.

A trunk or hitch mounted carrier typically provides one or more pairs of parallel, horizontally extending bars which extend out rearward of the vehicle. Soft rubber doughnuts spaced in pairs along the two support rods typically receive the top tube of each bicycle to be supported on the carrier. Other known carriers employ rubber coated steel tubes with heavy gauge wire. Bungy cords or elastic cables are typically used to restrain the bike and to prevent the bike from pivoting on the bracket. However, it is desirable to avoid any loose components which are not integral with the carrier to prevent them from becoming lost.

What is needed is a vehicle carrier bracket which is adaptable to hold bicycles or skis, and when used to hold bicycles, functions as to restrict tilting or pivoting of the device.

SUMMARY OF THE INVENTION

The brackets of this invention are mounted to the rearwardly extending tubular arms of a conventional carrier rack to alternatively support bicycles or skis. In a first embodiment, two brackets are mounted to the carrier rack, one on each of two rearwardly extending arms. Each bracket is a molded plastic part which has a body configured on one side to engage with and support a bicycle frame tube and on the other side to support a ski. The body extends from a pair of rings which are slidably positioned on a carrier rack arm. The rings are lined with a resilient material and thus permit the bracket body to be locked to restrict sliding and rotating with respect to the carrier arm. The carrier is rapidly configured for either ski or bicycle support by positioning either the bicycle support side or the ski support side to face upwardly. The ski supporting side of the body has a planar surface with upwardly extending side ridges which restrict shifting of narrow skis. For wider skis, the ridge tops define a plane for mounting the skis against. A lip extends upwardly from the body opposite the rings. The lip engages with the toe bracket of the ski binding to position and hold in place the skis until the engaging strap can be tightened to restrain the skis. The bicycle supporting side of the bracket body has two pairs of opposed, outwardly extending resilient tipped fingers for engaging either the vertical or horizontal tube of a bicycle frame. A rubber strap extends from one side of the body to encircle either a bicycle tube or skis and is engaged by a hook on the other side of the body. The carrier mounting bracket may be utilized with a trunk carrier or with a hitch carrier.

For use with a carrier having only a single rearward arm, two brackets may be pinned to a central structural member having a lever operated clamp which engages the single arm. One bracket may then be extended horizontally to support the horizontal tube of the bicycle, and the other bracket pivoted vertically to support the bicycle vertical tube.

It is an object of the present invention to provide a bracket for use with a car mounted carrier which can be used for carrying bicycles and skis.

It is another object of the present invention to provide a bracket for use with a car mounted carrier which prevents pivoting or tilting of a supported bicycle.

It is a further object of the present invention to provide a bracket which may be selectively positioned so as to engage either a bicycle top tube or seat tube or front down tube.

It is a still further object of the present invention to provide a bracket which can be used with a trunk mounted or hitch mounted bicycle carrier.

Further objects, features and advantages of the invention will be apparent from the following detailed description when taken in conjunction with the accompanying drawings.

DESCRIPTION OF THE PREFERRED EMBODIMENTS

Figure 1:
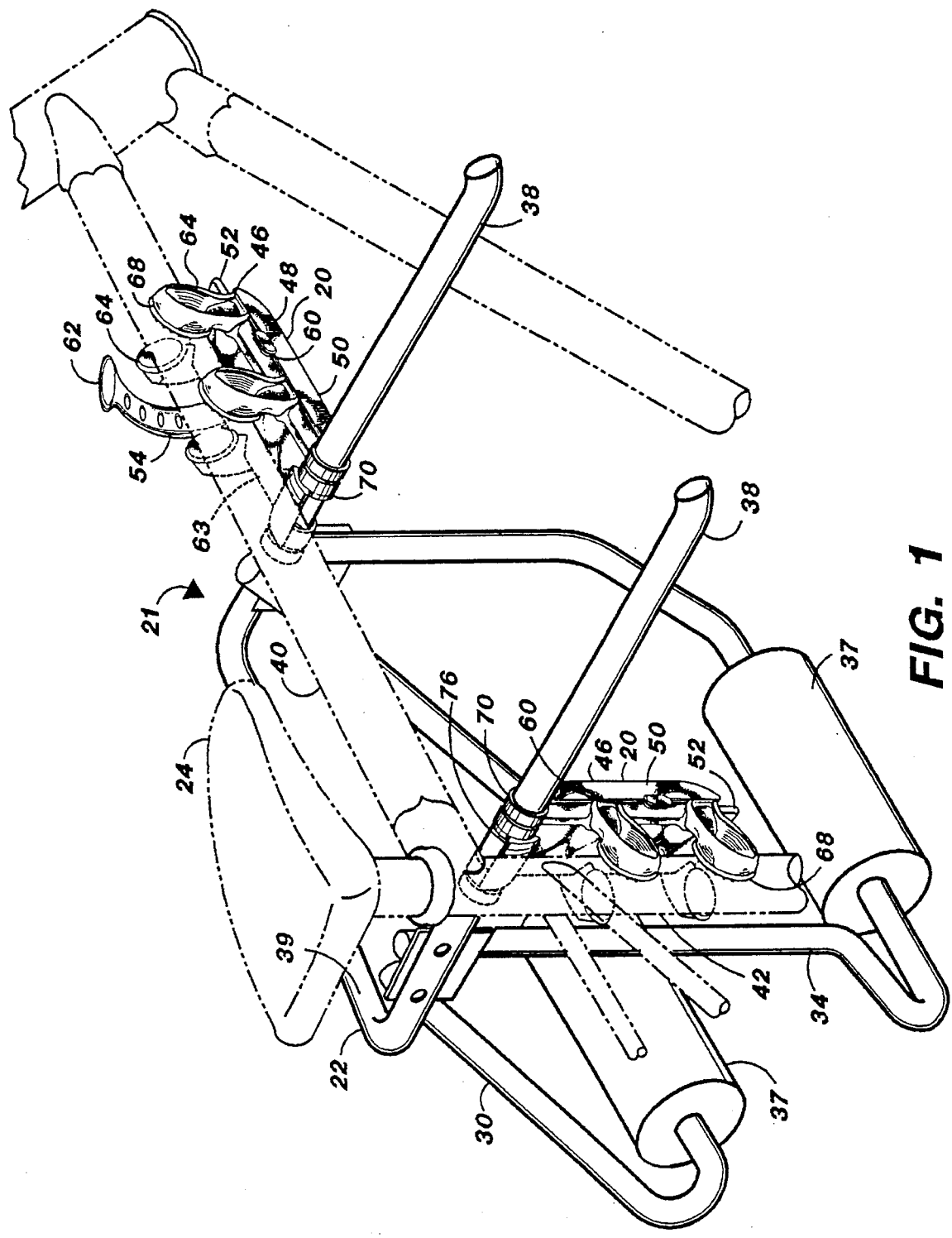
FIG. 1 is an isometric view of the brackets of this invention employed on a carrier rack to support a bicycle.
Figure 2:
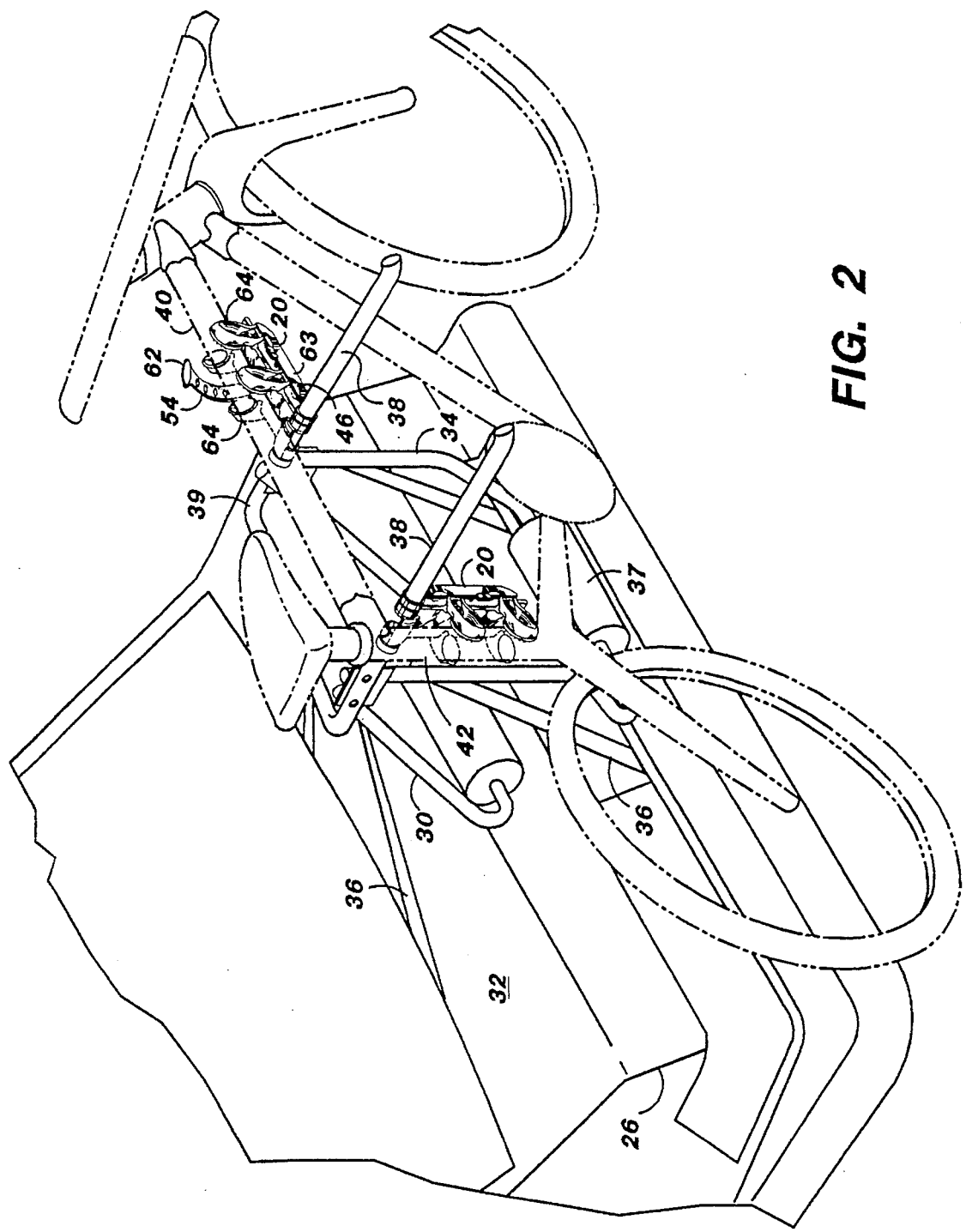
FIG. 2 is an isometric view of the carrier assembly of FIG. 1 mounted to the rear of a car.
Figure 6:
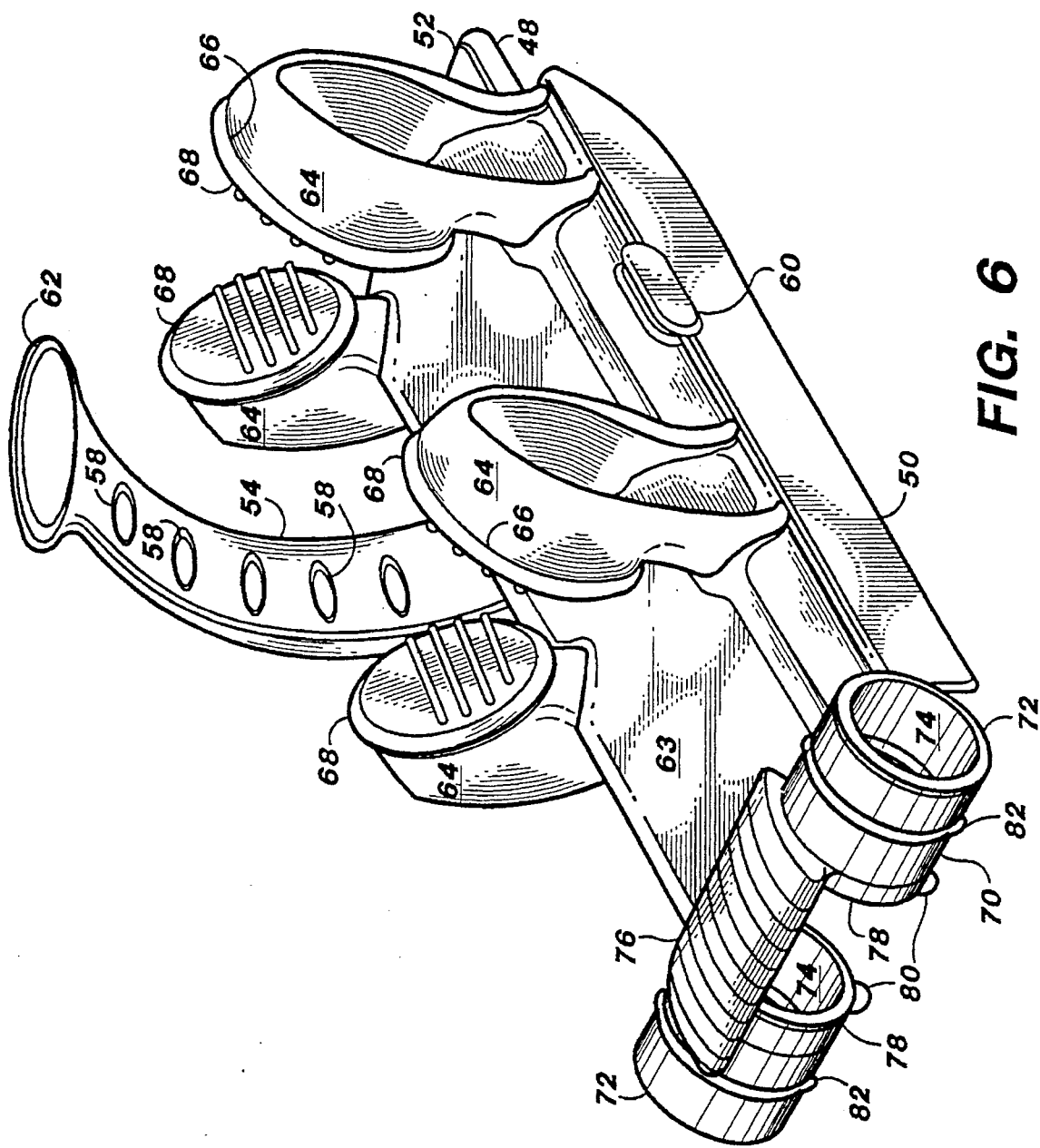
FIG. 6 is an isometric view of the bracket of FIG. 1 with the bike frame supporting side of the bracket face up.
Figure 7:
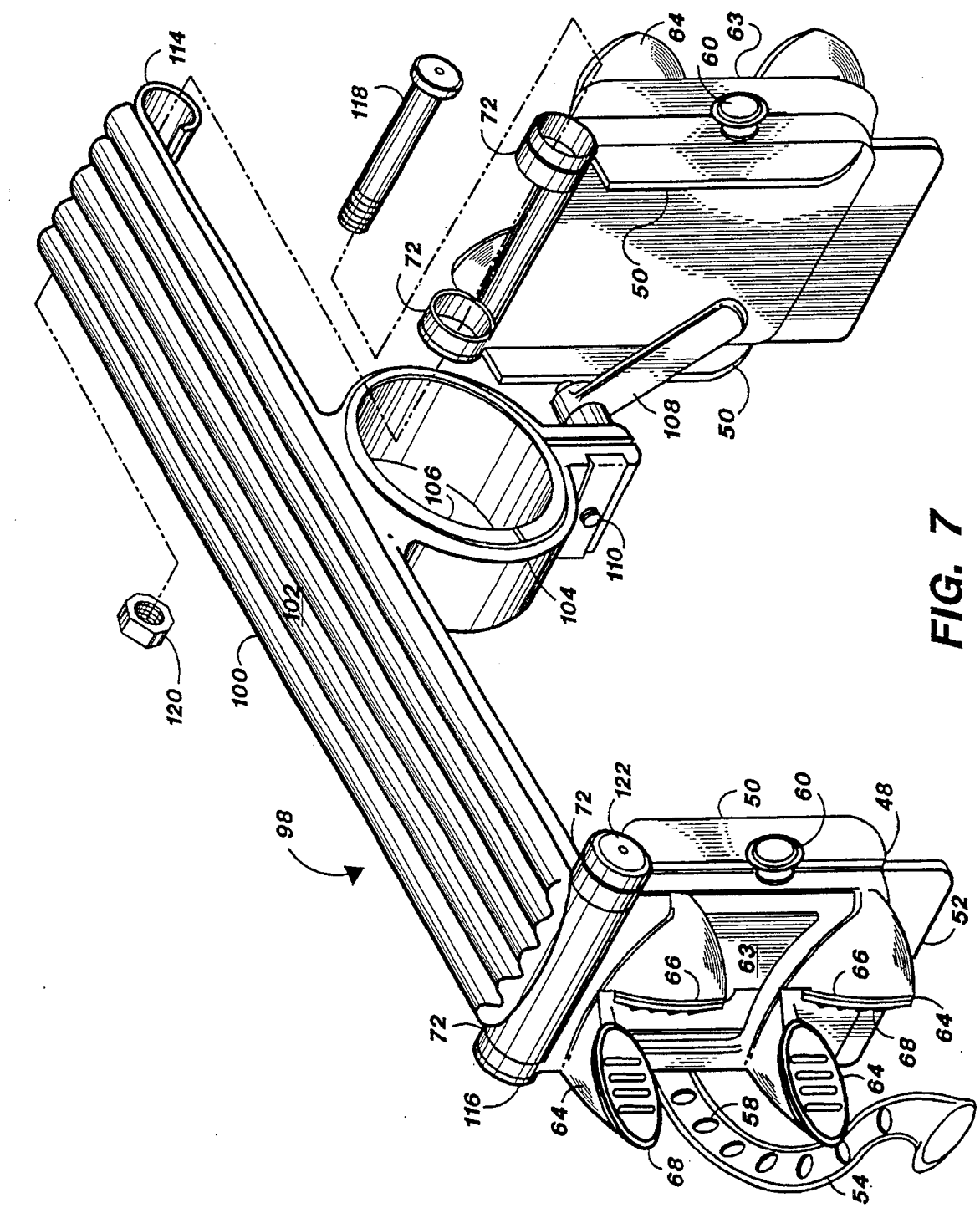
FIG. 7 is a partially exploded isometric view of the bracket of FIG. 3.
Figure 8:
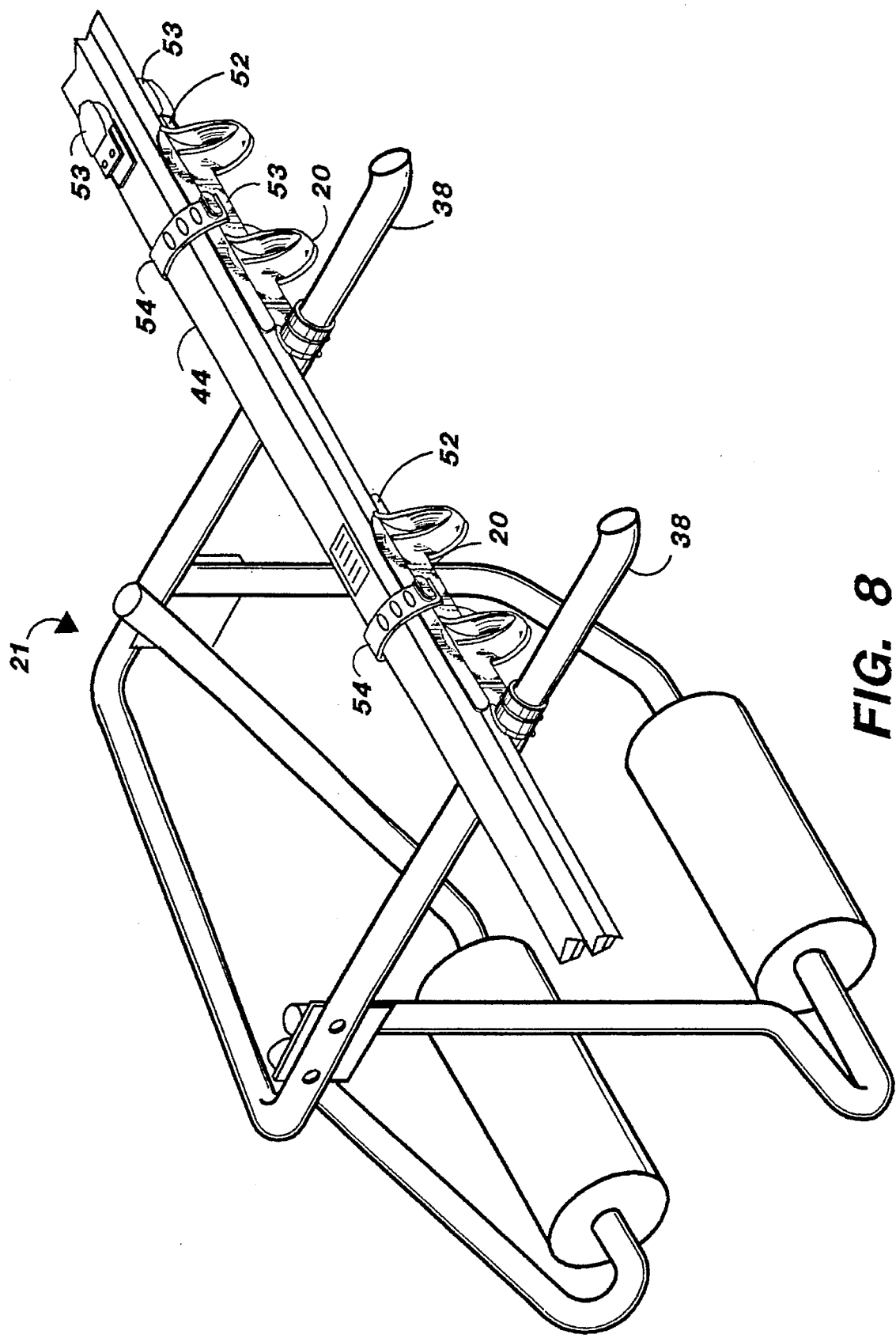
FIG. 8 is an isometric view of the bracket of FIG. 1 as deployed to carry skis.

Referring more particularly to FIGS. 1–10, wherein like numbers refer to similar parts, a carrier assembly 21 for the support of bicycles or skis is shown in FIG. 1. The carrier assembly 21 is composed of a plurality of brackets 20 of this invention which are mounted in pairs to a carrier rack 22, as shown in FIGS. 1 and 2. Carrier racks may take on a variety of configurations, but in general, the rack 22 has two rearwardly extending horizontal parallel arms 38. A bracket 20 is mounted to each arm 38, and together the brackets support either a bicycle 24, as shown in FIG. 1, or skis 44, as shown in FIG. 8. Although in a typical use multiple pairs of brackets 20 will be arrayed in spaced parallel relation along the arms 38 to support two or more bicycles on the rack 22, for clarity a single pair of brackets 20 has been illustrated.

The carrier rack 22 has a first U-shaped tubular member 30 which is engaged against the trunk 32 of the car 28, and a second U-shaped tubular member 34 which engages the rear 26 of the car 28. A strap 36 extends from each U-shaped member 30, 34 into the trunk, to therein restrain the carrier rack 22 from motion. The U-shaped members 30, 34 are cushioned by foam covers 37 to avoid marring of the automobile finish. The two horizontal arms 38 on which the brackets are mounted are portions of a third tubular member 39 which is connected to and supported by the two U-shaped members 30, 34.

Most modern bicycles 24, such as the example shown in FIG. 1, have a frame which includes a generally horizontal top tube 40 and a generally vertical seat tube 42. To both prevent front to back translation and pivoting of the bicycle, one bracket 20 engages the top tube 40 of the bicycle 24, while the other bracket 20 engages the seat tube 42 of the bicycle 24. Where the bracket 20 engages the top tube 40, it holds and positions the top tube 40 with respect to the carrier arm 38 and the carrier rack 22. The bracket 20 which engages the seat tube 42 holds the seat tube 42 fixed spatially with respect to the arm 38 and also prevents the bicycle from tilting or pivoting due to vehicular motion.

Identical brackets 20 can be used to grip either the top tube 40 or the seat tube 42. By employing identical brackets manufacturing and inventory costs are reduced. In addition, the utility of the carrier assembly is increased by allowing bicycles 24 to be mounted on the rack 22 with the front wheel to the fight or to the left.

The carrier assembly 21 may be easily converted for use in transporting skis 44, as shown in FIG. 8, by sliding the brackets 20 off the arms 38 and flipping each bracket to present the ski support surfaces.

Figure 5:
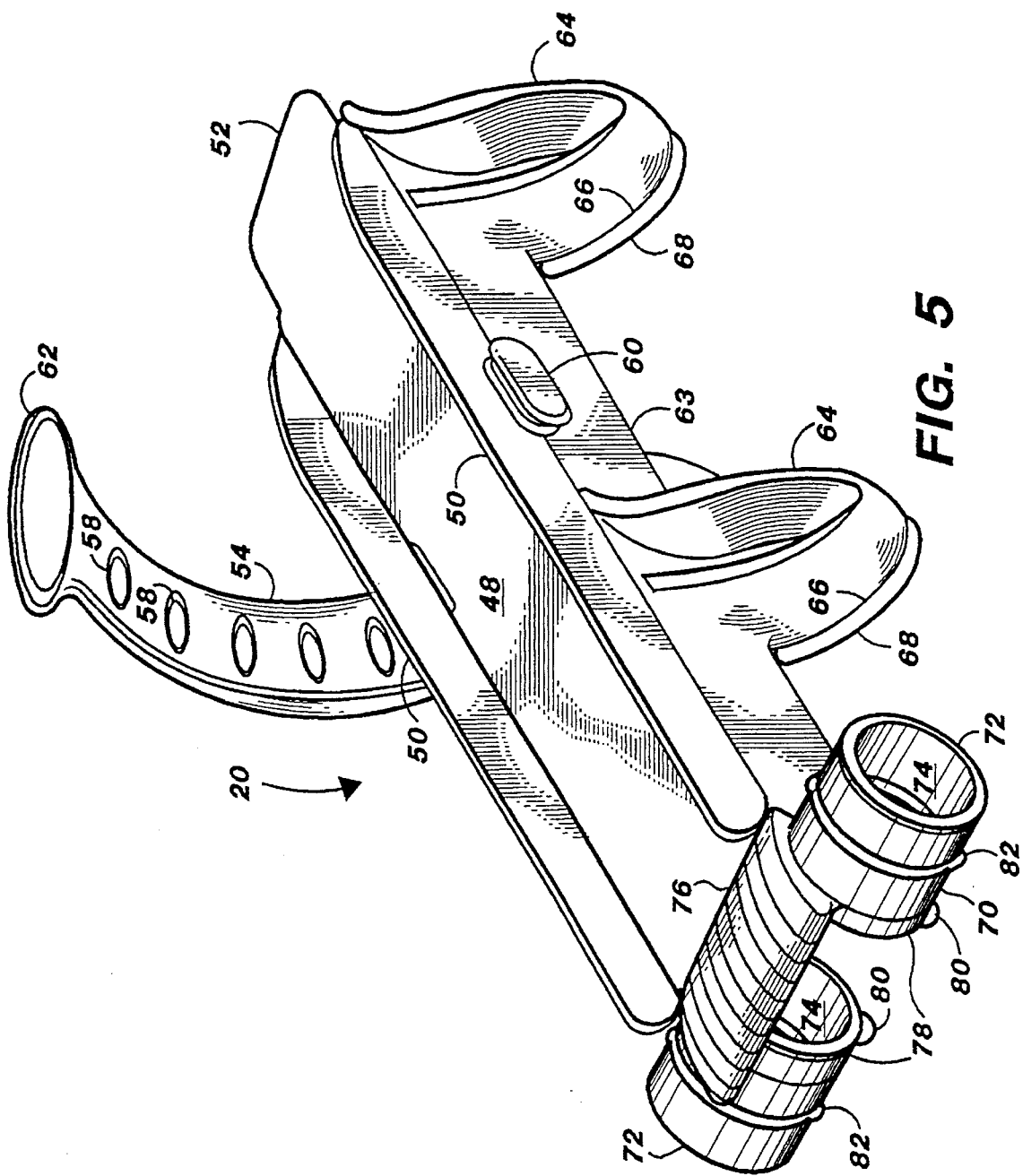
FIG. 5 is an isometric view of the bracket of FIG. 1 with the ski supporting surface face up.

Each bracket has a structural backbone or body 46 which is configured on a first side 48 to accept skis, as shown in FIG. 5, and is configured on a second side 63 to engage a bicycle frame tube, as shown in FIG. 6. The first side 48 of the body is flat to facilitate receiving and holding skis 44. Projecting ridges or rails 50 on either side of the flat side 48 retain and position narrow skis 44. Wider skis are supported on the tops of the rails 50 and are held in position by the straps 54, as shown in FIG. 8. Extending from the first side is a lip 52 which is sized to engage the toe portion 53 of a ski binding to properly position the skis 44 and to hold the skis while a rubber strap 54, shown in FIG. 6, is fastened about the skis to retain them on the bracket 20. The rubber strap 54 has a plurality of spaced apart holes 58, one of which is engaged by a strap hook 60 which projects from the body 46. The strap 54 is conveniently terminated by a tab 62 which facilitates stretching the strap 54 and looping one of the holes 58 over the hook 60. The tension in the strap 54 can be adjusted by selecting the hole 58 which is engaged with the hook 60.

The second side 63 of the body 46 has two pairs of opposed fingers 64 which are adapted to engage the frame tubes of a bicycle. Each finger 64 extends upwardly and outwardly from the body 46. The fingers 64 have inclined faces 66, the planes defined by the inclined surfaces 66 of opposed fingers meeting at an angle of approximately 60°. The inclined surfaces 66 are covered with soft rubber pads 68 to facilitate gripping and holding without marring the frame members of a bicycle. The inclined pads 68 of the two pair of opposed fingers allow a single bracket to be used to support bicycle frame tubes of a wide range of diameters, as well as bicycle frame tubes which are circular, oval, or other shape in section. As shown in FIG. 6, the strap 54 can be wrapped around the second side to retain a bicycle frame member between the opposed fingers 64.

A hinge is formed by two cylindrical members or rings 72 on the end 70 of the bracket 20 opposite the ski binding engaging lip 52. The rings 72 are aligned along a common axis about which the bracket 20 may pivot. The rings 72 allow the body to be positioned on the carrier rack, with an arm 38 extending through cylindrical openings 74 in the rings 72. To prevent sliding along the arm 38, a rubber member 76 is mounted between the cylindrical members 72 to frictionally engage the support arm 38. Cylindrical portions 78 of the rubber member 76 may be pulled away by tabs 80 from the support arm 38. The cylindrical portions 78 can be positioned by the tabs 80 over retaining ridges 82 on the rings 72, thus allowing the bracket 20 to rotate and slide freely on the arms 38 for positioning. When properly positioned further sliding of the bracket 20 on the arm 38 may be prevented by releasing the rubber cylindrical portions 78 to again grip the arm 38. The rubber member 76 also protects the bicycle frame from hitting the carrier arm 38.

Multiple brackets 20 can thus be mounted on the arms 38 of a carrier to support one, two or more bicycles, and may be flipped in orientation to alternatively support skis.

Figure 4:
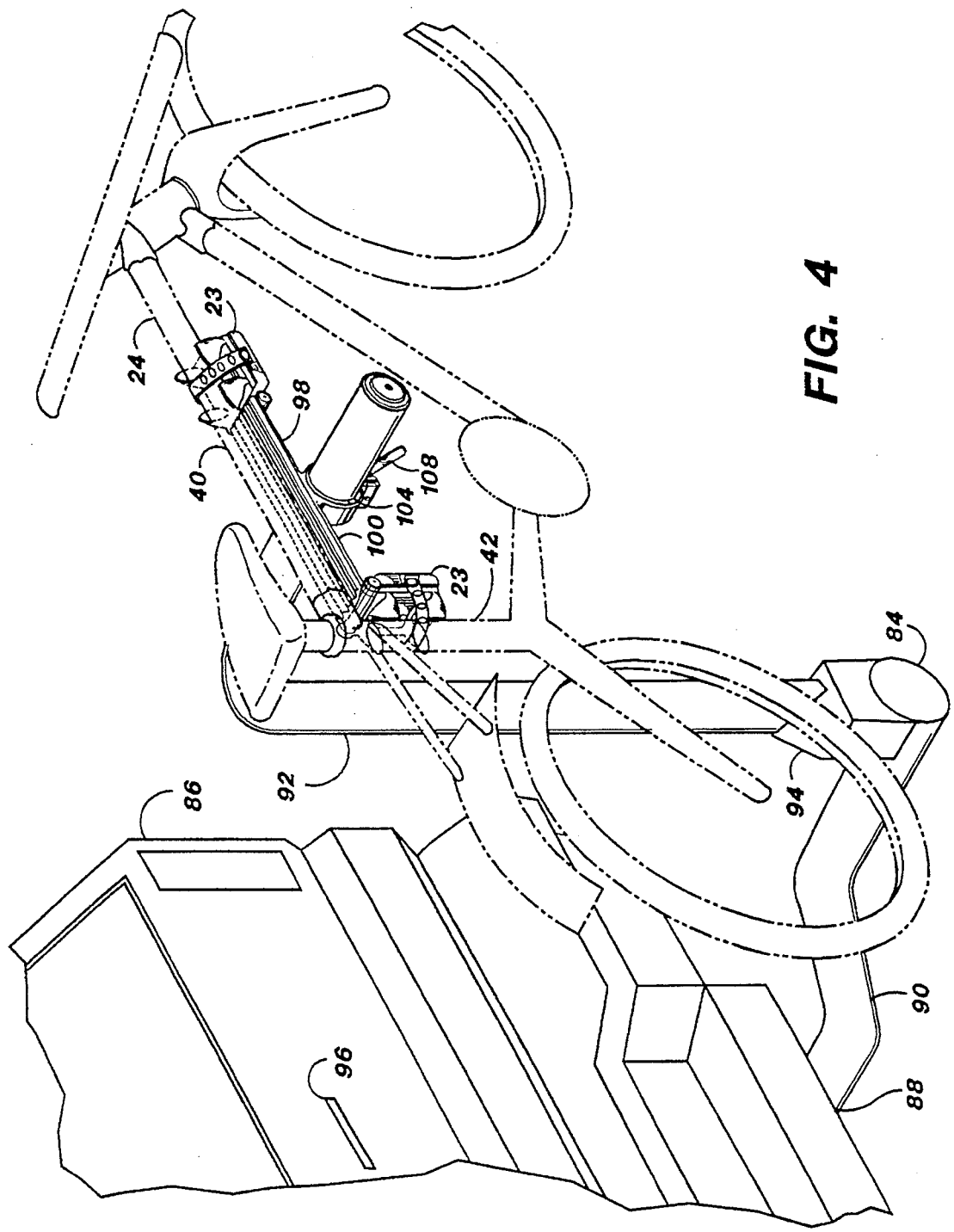
FIG. 4 is an isometric view of the carrier assembly of FIG.3 mounted to a car.

Another type of equipment carrier 84 is illustrated in FIG. 4. The carrier 84 is designed to be utilized on a vehicle 86 which is equipped with a trailer hitch 88. The carrier 84 has a structural member 90 which engages with the hitch. An upstanding L-shaped support tube 92 mounted by a bracket 94 to the structural member 90. The bracket allows the L-shaped support member to pivot to facilitate opening the rear door 96 of the vehicle 86.

Figure 3:
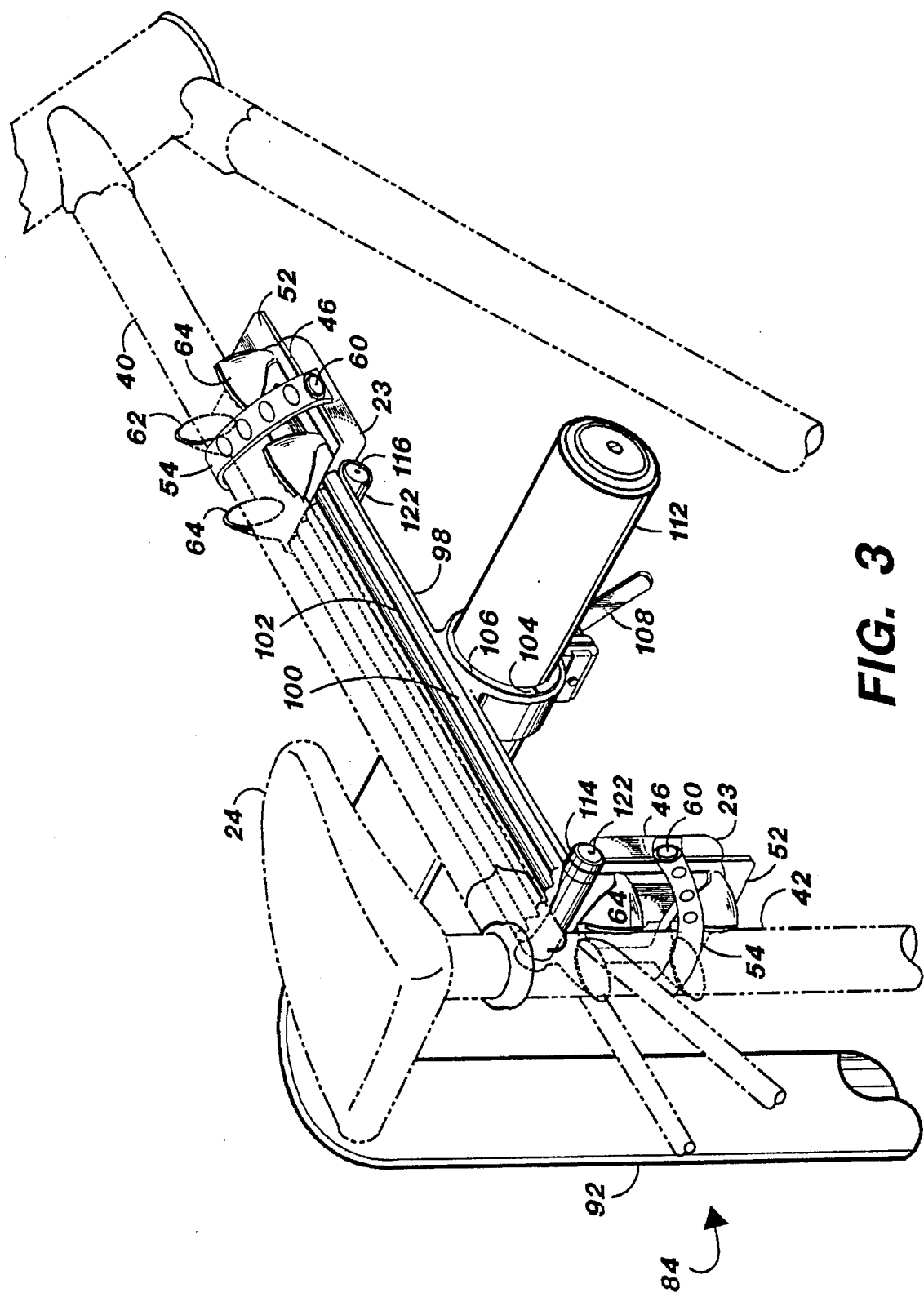
FIG. 3 is an isometric view of alternative embodiment carrier brackets mounted to a carrier and supporting a bicycle.

For use with a carrier 84 having a single arm, as shown in FIGS. 3 and 7, two brackets 23 are joined by a soft surface deck 100 to form a composite carrier bracket 98. The composite carrier bracket 98 soft deck 100 is covered by a soft rubber extrusion 102. A lever operated clamp 104 is centrally mounted below the deck 100. The clamp 104 is lined with a grooved rubber liner 106. The split-ting clamp 104 has a locking handle 108. Turning the locking handle 108 causes a threaded member 110 to draw the two halves of the semicylindrical clamp 104 together, thereby causing the liner 106 to compress against the horizontally extending portion 112 of the L-shaped member 92.

The brackets 23, as shown in FIG. 7, are joined to the ends 114 and 116 of the deck 100 by hinged portions which form hinges with the cylindrical portions 78 of the brackets. The hinge pins forming the joints 122 are bolts 118 held in place by nuts 120. The hinged joints 122 formed by the hinge pins 118 and the ends 114, 116 and cylindrical portions 78 allow the positioning of the brackets 23, as shown in FIG. 3, to engage either the top tube 40 or the seat tube 42, thus providing both the retaining positioning functions as well as restricting the pivoting of the bicycle about a horizontal axis. Although a single composite carrier bracket 98 is shown mounted on the horizontal portion 112 of the L-member 92, two, three or more composite brackets 98 may be used to hold multiple bicycles.

Figure 9:
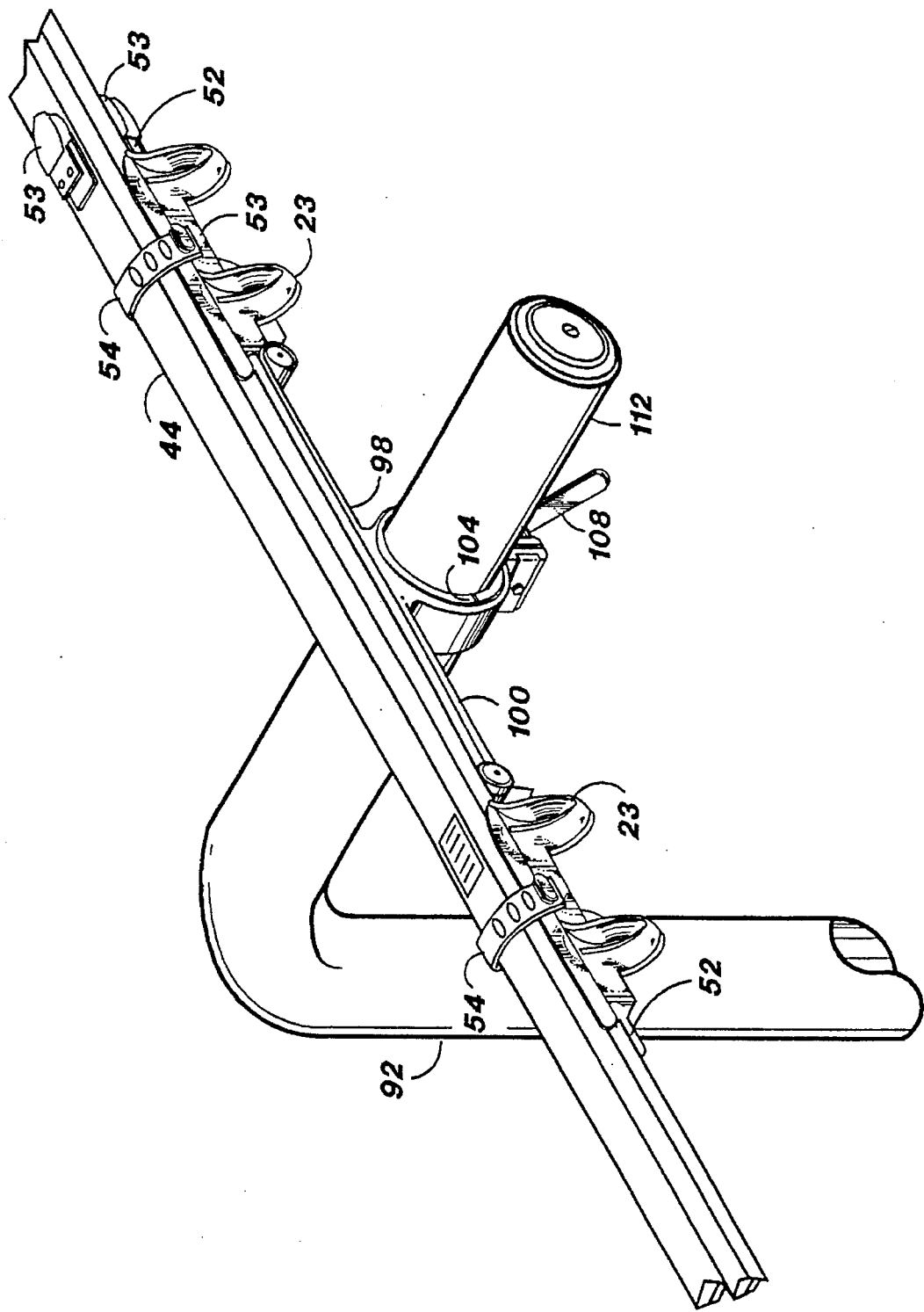
FIG. 9 is an isometric view of the bracket of FIG. 3 as deployed to carry skis.

As shown in FIG. 9, the brackets 23 may be reversed so that the flat sides 48 extend vertically for the carrying of skis. This is accomplished by removing the hinge pin or hinge bolts holding the brackets 23 and reconnecting them to the carrier bracket 98. The clamp 104 is loosened and the deck 100 is brought to a vertical position. The toe binding portion of the skis 53 is positioned against the lip 52. The lip 52 properly positions the skis on the carrier bracket 98.

Figure 10:
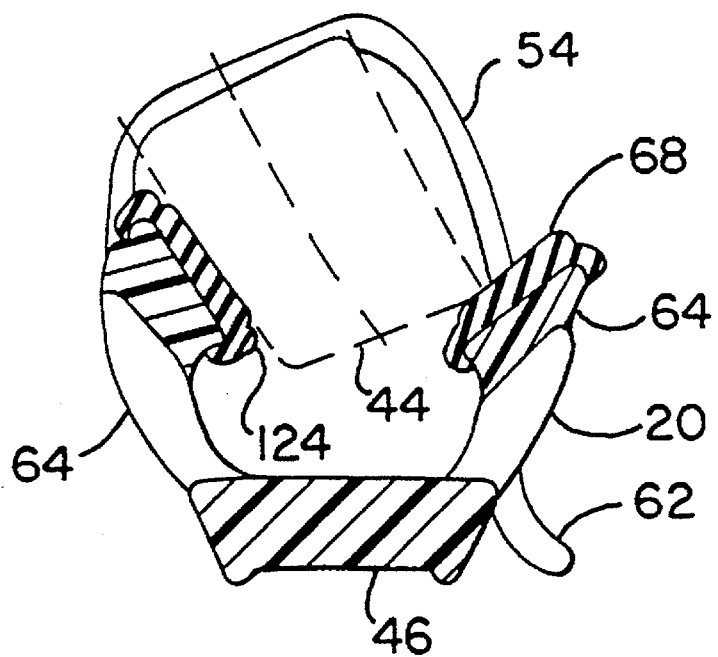
FIG. 10 is a cross-sectional view of the bracket of FIG. 1 engaging a pair of skis therein.

An alternative application of the bracket 20 is shown in FIG. 10. A set of skis 44 may be rested in a volume 124, may be constructed to permit the supporting of skis between the resilient surfaces of the fingers 64. The skis would then be gripped between the two inclined planes defined by the four fingers which protrude upwardly and outwardly from the body. Hence a bicycle frame tube may be engaged by the four fingers, or alternatively skis may be supported.

It should be understood that an additional L-shaped member could be mounted on the hitch engaging member to support additional carrier brackets 98 and additional bicycles or skis. Furthermore, although the side of the bracket used to retain skis is shown as generally planar in configuration, it could have other shapes so long as the bracket defines a plane along which the skis may be held, thus, any bracket with at least three points or features which are coplanar could serve the function of supporting skis. For example a V-shaped groove may be employed to grip the sides of skis.

Although the hinged connection of the brackets 20 is formed by a cylindrical opening 74, a portion of the bracket 20 forming the hinge need not completely surround the arm. Additionally, the rubber member 76 could be eliminated by incorporating into the bracket 20 lever operated clamp. The bracket 20 can be used with numerous existing carrier racks of the type having two parallel extending arms The carrier bracket 98, as illustrated in FIG. 7, could be utilized with numerous existing or new carrier racks which utilize one or more arms.

It is understood that the invention is not limited to the particular construction and arrangement of parts herein illustrated and described, but embraces such modified forms thereof as come within the scope of the following claims.

We claim:

1. A bracket for mounting recreational equipment on vehicle mounted carrier having at least one rearwardly extending carrier arm, the bracket comprising:

a) body having a first side and an opposed second side;

b) at least two opposed members which extend from the first side for engaging the frame of a bicycle;

d) a restraining strap mounted to the body and selectably extendable across either the first side or the second side, the strip adapted to be used to hold a bicycle when extended across the first side and to hold at least one ski when extended across the second side;

e) a fastener which extends from the body, and which is engageable with the strap; and f) portions of the body defining a pivotal mount adapted for releasable attachment to the carrier arm, wherein the body may be positioned on the arm in an orientation to selectably present the bracket first side or the bracket second side for engagement with the frame of the bicycle or the at least one ski, respectively, wherein the second side has a unit of rails extending perpendicular to a plane defined by said second side and wherein the rails are spaced apart to position the at least one ski therebetween.

2. A vehicle carrier mounted rack for the transportation of bicycles of the type which mounts to the trailer hitch of a vehicle, the carrier rack having a hitch engaging member that extends rearward of the vehicle and a vertically extending member which is attached to the hitch member by a bracket, the improvement comprising:

a) at least one substantially horizontally support arm joined to the vertically extending member, said support arm extending rearwardly of the vehicle;

b) two brackets, wherein each bracket has a body portion with a first side having projecting portions with surfaces which define two planes wherein the planes intersect each other, wherein a bicycle frame tube is supportable on said surfaces;

d) a deck having opposite ends and which is positionably connected transversely to the support arm intermediate said opposite ends, wherein said two brackets are pivotably connected to the opposite ends of the deck, respectively; and e) a restraining strap connected to each bracket, and selectably engageable with a bracket mounted on the body portion to encircle and hold the bicycle frame tube on the first side.

3. The carrier rack of claim 2 wherein the first side has two pair of two projecting portions, and wherein resilient material is affixed to each projecting portion to present a slip-resistant surface for engagement with the bicycle frame tube.

4. The carrier rack of claim 2 each bracket further comprising ski positioning means extending from a second side of the bracket opposite the first side.

5. The carrier rack of claim 2 wherein at least one of the brackets is adapted to be selectably disconnected from the deck, rotated 180 degrees, and reconnected to the deck to alter the function of the carrier from supporting the bicycle frame to supporting skis.

6. The carrier of claim 2 wherein the surfaces of the body projecting members define planes intersecting at approximately 60 degrees.

7. A vehicle mounted rack for the transportation of bicycles of the type which mounts to the trailer hitch of a vehicle and having a hitch engaging member that extends rearward of the vehicle and a vertically extending member which is attached to the hitch member by a bracket, the improvement comprising:

a) a horizontal rearwardly extending arm joined to the vertical member;

b) a planer deck member connected to the horizontal arm, the planer deck member extending substantially perpendicular to the horizontal arm, the deck having a first end terminating in a first hinge and a second end terminating in a second hinge;

c) a first bracket pivotably mounted to the first hinge, the first bracket having a first side and an elastic strap extendable across the first side to hold an object to the first side; and d) a second bracket pivotably mounted to the second hinge, the second bracket having a first side and an elastic strap extendable across the first side of the second bracket to hold an object to the first side of the second bracket, the strap also being extendable across the second side so as to alternatively hold an object to either the first side or the second side.

8. The vehicle mounted rack of claim 7 wherein the first side of each bracket has at least one pair of opposed members extending outwardly from the first side for engaging the frame member of a bike.

9. The vehicle mounted rack of claim 7 wherein the each bracket includes a second side opposite said first side defining a planar surface for mounting a pair of skis thereto and wherein the second side of at least one of the brackets has a means for positioning the skis thereto.

10. The vehicle mounted rack of claim 7 wherein the hinged connections of the first and second brackets may be readily disassembled so the first and second brackets may be rotated 180 degrees and reconnected 11. A vehicle mounted rack for the transportation of bicycles of the type which mounts to the trailer hitch of a vehicle and having a hitch engaging member that extends rearward of the vehicle and a vertically extending member which is attached to the hitch member by a bracket, the improvement comprising:

a) a horizontal arm joined to the vertical member, said support arm extending rearwardly of the vehicle;

b) a planer deck member connected to the horizontal arm, the planer deck member extending substantially perpendicular to the horizontal arm, the deck having a first end and a second end;

c) at first bracket pivotably mounted to the first end, the first bracket having a first side and an strap extendable across the first side to hold an object to the first side; and d) a second bracket pivotably mounted to the second end, the second bracket having a first side and a strap extendable across the first side of the second bracket to hold an object to the first side of the second bracket.

\* \* \* \* \*